United States Patent
Bogner et al.

(10) Patent No.: US 9,476,319 B2
(45) Date of Patent: Oct. 25, 2016

(54) TURBOCHARGER WITH COOLED TURBINE HOUSING AND REDUCED PRESSURE LOSS

(75) Inventors: Mathias Bogner, Neutraubling (DE); Ralph-Maurice Koempel, Mannheim (DE); Marc Hiller, Morschheim (DE)

(73) Assignee: Continental Automotive GmbH, Hannover (DE)

( * ) Notice: Subject to any disclaimer, the term of this patent is extended or adjusted under 35 U.S.C. 154(b) by 547 days.

(21) Appl. No.: 13/984,985

(22) PCT Filed: Feb. 8, 2012

(86) PCT No.: PCT/EP2012/052126
§ 371 (c)(1), (2), (4) Date: Aug. 12, 2013

(87) PCT Pub. No.: WO2012/107487
PCT Pub. Date: Aug. 16, 2012

(65) Prior Publication Data
US 2013/0315712 A1 Nov. 28, 2013

(30) Foreign Application Priority Data
Feb. 10, 2011 (DE) .......... 10 2011 003 906

(51) Int. Cl.
*F04D 29/00* (2006.01)
*F02B 39/00* (2006.01)
*F01D 25/00* (2006.01)
(Continued)

(52) U.S. Cl.
CPC ............ *F01D 25/14* (2013.01); *F02C 6/12* (2013.01); *F04D 29/4206* (2013.01); *F04D 29/584* (2013.01); *F02B 39/005* (2013.01); *F05D 2260/232* (2013.01)

(58) Field of Classification Search
CPC ...... F01D 25/14; F02C 6/12; F04D 29/4206; F04D 29/584; F02B 39/005; F05D 2260/232
USPC ................ 60/605.3; 415/116, 177, 178
See application file for complete search history.

(56) References Cited

U.S. PATENT DOCUMENTS

| 8,365,526 B2 | 2/2013 | Stiermann |
| 2004/0083730 A1 | 5/2004 | Wizgall et al. |

(Continued)

FOREIGN PATENT DOCUMENTS

| CN | 1580514 A | 2/2005 |
| CN | 101037977 A | 9/2007 |

(Continued)

OTHER PUBLICATIONS

Machine Translation De 10 2008 011 1257 Done Jan. 11, 2016.*
(Continued)

*Primary Examiner* — Audrey K Bradley
*Assistant Examiner* — Dapinder Singh
(74) *Attorney, Agent, or Firm* — Laurence A. Greenberg; Werner H. Stemer; Ralph E. Locher

(57) ABSTRACT

A turbocharger has a turbine housing formed with a coolant inlet channel and a coolant outlet channel. The turbine housing contains a coolant separating region in which delivered coolant is separated and a coolant combining region in which coolant is combined again. Each of the coolant separating region and the coolant combining region is equipped with a conical conducting body.

8 Claims, 4 Drawing Sheets

(51) Int. Cl.
*F01D 25/14* (2006.01)
*F02C 6/12* (2006.01)
*F04D 29/42* (2006.01)
*F04D 29/58* (2006.01)

(56) References Cited

U.S. PATENT DOCUMENTS

2006/0083609 A1    4/2006   Augspurger
2013/0101386 A1*   4/2013   Pandey ................. F01D 25/12
                                                      415/1
2013/0142623 A1*   6/2013   Lee ....................... F01D 9/026
                                                      415/116

FOREIGN PATENT DOCUMENTS

DE      10235189 A1       2/2004
DE      102008011257 A1   9/2009
EP      1835164 A2        9/2007
WO      2009106166 A1     9/2009

OTHER PUBLICATIONS

Beinert, Statement of Relevance.
Author not named, "Theoretische Grundlagen", pp. 8-13.

* cited by examiner

TURBOCHARGER WITH COOLED TURBINE HOUSING AND REDUCED PRESSURE LOSS

BACKGROUND OF THE INVENTION

Field of the Invention

The invention relates to an exhaust-gas turbocharger which has a cooled turbine housing.

Exhaust-gas turbochargers serve for improving the efficiency of an internal combustion engine and thus increasing the power thereof. For this purpose, the exhaust-gas turbocharger has a turbine with a turbine wheel and has a compressor with a compressor wheel, wherein the two rotor wheels are arranged on a common shaft. Here, the turbine wheel is driven by an exhaust-gas mass flow from a connected internal combustion engine, and in turn drives the compressor wheel. The compressor compresses inducted fresh air and conducts said fresh air to the internal combustion engine. The common shaft is mounted in a bearing housing of the turbocharger. Furthermore, the turbine wheel of the turbine is arranged in a turbine housing, and the compressor wheel of the compressor is arranged in a compressor housing.

An exhaust-gas turbocharger of said type must satisfy a wide variety of requirements during operation on the internal combustion engine or on an engine connected thereto. One of said requirements consists in accommodating the high temperatures which can arise in the turbocharger housing for example owing to the hot exhaust-gas mass flow.

Here, the conventional construction of an exhaust-gas turbocharger provides individual housings which are composed in each case of a material suited to the temperature prevailing there. Here, the compressor housing is normally composed of aluminum, whereas the bearing housing is composed of cast iron, wherein the bearing housing may additionally also be designed to be water-cooled. The turbine housing is generally composed, owing to the high temperatures that prevail in said region, of high-temperature-resistant nickel alloys. Owing to the different, suited materials for the individual housings, said housings are formed as separate parts which are connected to one another and which must furthermore be sealed off with respect to one another.

High-temperature-resistant nickel alloys represent a considerable cost factor. Thus, owing to the high material costs, the turbine housing constitutes the most expensive single item in the overall costs of an exhaust-gas turbocharger.

FIG. 1 shows the price development for nickel and aluminum in the last five years. The use of cheaper cast materials for the turbine housing, such as for example aluminum alloys, would considerably reduce the overall costs of an exhaust-gas turbocharger. Said materials are however considerably less temperature-resistant than nickel alloys.

So as not to exceed the maximum admissible material loads, active cooling of the exhaust-gas turbocharger may be realized by means of the cooling circuit of the internal combustion engine. Here, however, it must be ensured that the coolant pressure losses occurring in the exhaust-gas turbocharger incorporated into the cooling circuit of the internal combustion engine are as low as possible.

BRIEF SUMMARY OF THE INVENTION

It is consequently the object of the invention to specify an exhaust-gas turbocharger in which the coolant pressure losses are reduced.

Said object is achieved by means of an exhaust-gas turbocharger having the features as claimed. The dependent claims specify advantageous embodiments and refinements of the invention.

An exhaust-gas turbocharger according to the present invention has a turbine housing which has a coolant inlet duct and/or a coolant outlet duct. In the turbine housing, there are provided a coolant splitting-up region and/or a coolant merging region in which coolant delivered through the coolant inlet duct is split up, or coolant is merged to form a common coolant outlet flow, respectively. Furthermore, in the coolant splitting-up region and/or in the coolant merging region, there is arranged in each case one cone-shaped guide body which optimizes the coolant flow.

An exhaust-gas turbocharger having the features specified in claim 1 has the advantage that the pressure loss of the coolant passing through the turbine housing is reduced. This in turn has the advantage that the additional costs incurred in the case of the cooling of the turbine housing being incorporated into the cooling circuit of the internal combustion engine are low. In the case of the cooling of the turbine housing being incorporated into the cooling circuit of the internal combustion engine, the cooling system of the turbine housing is connected in series with the cooling system of the internal combustion engine. If pressure losses occur in the cooling system of the turbine housing, this would also have an effect on the cooling system of the internal combustion engine. For example, it would be necessary to use a coolant pump of higher power. An alternative solution would be for the cooling system of the turbine housing to use a cooling system which is independent of the cooling system of the internal combustion engine. Both of the abovementioned alternatives are however undesirably associated with additional costs. With the use of an exhaust-gas turbocharger according to the present invention, said additional costs are eliminated.

A further advantage of the invention consists in that, owing to the cone-shaped guide body that is used, the flow geometry in the region of the coolant inlet and also in the region of the coolant outlet of the turbine housing is more robust with respect to manufacturing tolerances than is the case with known cooling systems. The opening angle of the guide body should basically be kept as small as possible in order to prevent flow detachment. The height of the guide body can be freely selected within the limits imposed by the thickness of the cooling jacket of the turbine housing, and may advantageously be selected such that the pressure losses of the coolant passing through the turbine housing are minimized.

Further advantageous characteristics of the invention will emerge from the exemplary explanation thereof below on the basis of FIGS. 2 to 8, in which:

DESCRIPTION OF THE INVENTION

Figure 1:
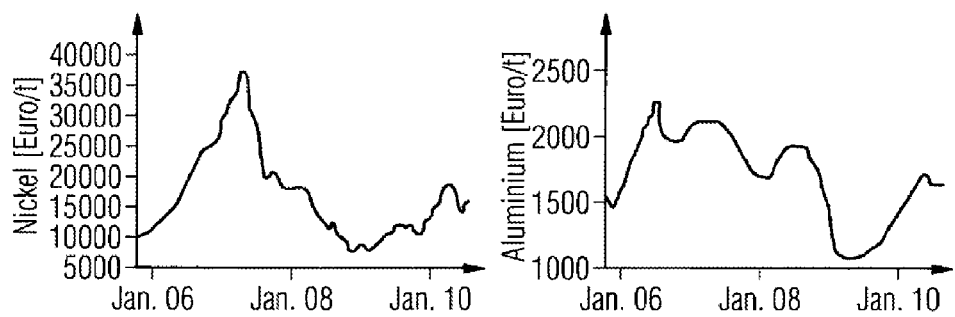
FIG. 1 shows price development for nickel and aluminum.
Figure 2:
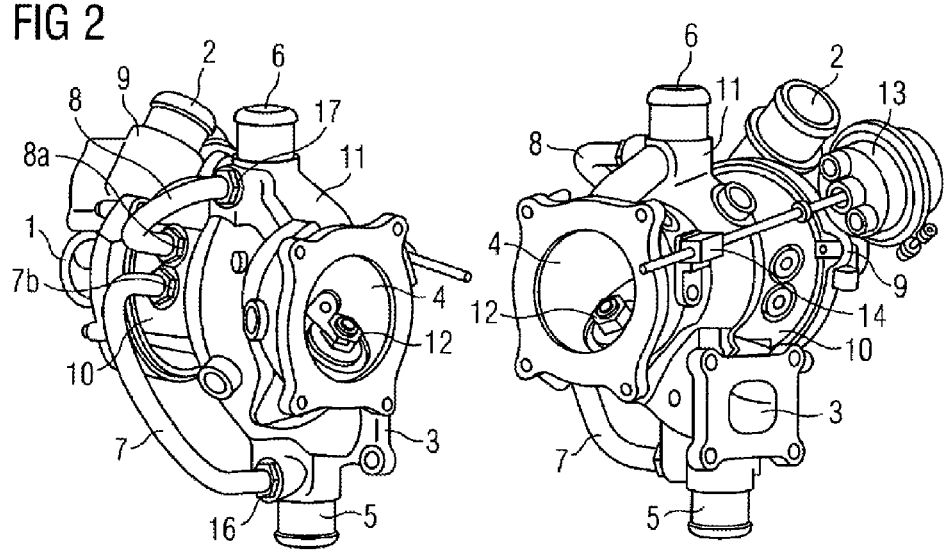
FIG. 2 shows perspective sketches illustrating an exhaust-gas turbocharger which has a wastegate and a water-cooled turbine housing.

FIG. 2 shows a perspective sketch illustrating an exhaust-gas turbocharger which has a wastegate and a water-cooled turbine housing.

The exhaust-gas turbocharger illustrated in FIG. 2 has a compressor housing 9, a bearing housing 10 and a turbine housing 11.

In the compressor housing 9, a compressor wheel is arranged on a common shaft in the conventional manner. In the turbine housing 11, a turbine wheel is arranged on the common shaft in the conventional manner. The common shaft is mounted in the bearing housing 10, which is positioned between the compressor housing 9 and the turbine housing 11. During operation of the exhaust-gas turbocharger, the turbine wheel is driven by means of an exhaust-gas mass flow of a connected internal combustion engine, and in turn drives the compressor wheel via the common shaft. The compressor compresses inducted fresh air and conducts said fresh air to the internal combustion engine.

The compressor housing 9 has a fresh-air inlet 1, through which fresh air is inducted into the exhaust-gas turbocharger from the environment, and a fresh-air outlet 2, through which compressed fresh air is discharged in order to be conducted onward to the internal combustion engine. Furthermore, the compressor housing 9 is provided with an overrun air recirculation valve (not shown in FIG. 2). Said overrun air recirculation valve has the task, during operation of the exhaust-gas turbocharger, of opening a bypass past the compressor in the event of a negative load step, such that excess charge pressure can be blown off.

The bearing housing 10 has a coolant inlet 7b and a coolant outlet 8a. During operation of the exhaust-gas turbocharger, coolant enters the bearing housing 10 through the coolant inlet 7b. During operation of the exhaust-gas turbocharger, coolant is discharged from the bearing housing 10 through the coolant outlet 8a. The coolant inlet 7b of the bearing housing 10 is connected to a hose 7 through which coolant is transported from the turbine housing 11 to the bearing housing 10. The coolant outlet 8a of the bearing housing 10 is connected to a hose 8 through which the coolant discharged from the bearing housing 10 is transported back to the turbine housing 11.

The turbine housing 11 has an exhaust-gas inlet 3, an exhaust-gas outlet 4, a coolant inlet 5, a coolant outlet 6, a wastegate 12, a coolant branch outlet 16, and a coolant return inlet 17. The exhaust-gas inlet 3 is connected to an exhaust-gas outlet of the internal combustion engine with which the exhaust-gas turbocharger is associated, such that during operation, the hot exhaust gas of the internal combustion engine passes into the interior of the turbine housing 11 through the exhaust-gas inlet 3. There, said exhaust gas is conducted by a spiral arranged upstream of the turbine wheel, and then drives the turbine wheel. The turbine wheel in turn drives, via the common shaft, the compressor wheel arranged in the compressor housing. The exhaust gas exits the turbine housing 11 again through the exhaust-gas outlet 4, which is connected to the catalytic converter of the motor vehicle.

During operation of the exhaust-gas turbocharger, coolant, for example cooling water, enters through the coolant inlet 5 which is provided on the underside of the turbine housing 11. Said coolant flows through the cooling jacket of the turbine housing and is finally discharged from the turbine housing 11 again through the coolant outlet 6 provided on the top side of the turbine housing 11. The turbine housing 11, which during operation of the exhaust-gas turbocharger is subjected to high temperatures owing to its positioning in the hot exhaust-gas flow, is actively cooled by said coolant. As a result of the arrangement of the coolant inlet 5 on the underside of the turbine housing and the arrangement of the coolant outlet 6 on the top side of the turbine housing, automatic degassing of the coolant is advantageously attained. Gas bubbles which could hinder the coolant flow are prevented from becoming stuck within the turbine housing.

For the regulation of the power of the turbine wheel, a wastegate 12 is integrated into the turbine housing 11. Said wastegate has a wastegate flap which, depending on the present demand, can be opened to a greater or lesser extent in order to conduct a desired fraction of the hot exhaust gas directly to the exhaust-gas outlet 4, bypassing the turbine wheel. The adjustment of the opening position of the wastegate flap is realized by means of a regulator 14 which is fastened to the outside of the turbine housing 11 and which is connected via a coupling rod to a pressure capsule 13.

Furthermore, the turbine housing 11 shown in FIG. 2 has a coolant branch outlet 16 which is connected to the hose 7. Coolant which is branched off within the turbine housing 11 is provided at said coolant branch outlet 16 and is transported through the hose 7 into the bearing housing via the coolant inlet 7b of the bearing housing 10. Furthermore, the turbine housing 11 shown in FIG. 2 has a coolant return inlet 17 which is connected to the hose 8. The coolant discharged from the bearing housing 10 is returned into the turbine housing 11 through said coolant return inlet 17.

The cooling system of the turbine housing is incorporated into the cooling circuit of the internal combustion engine, in the sense that the cooling circuit of the internal combustion engine and the cooling circuit of the turbine housing or of the exhaust-gas turbocharger are connected in series with one another. In this way, an adequately high coolant mass flow is ensured over the entire operating range of the internal combustion engine, if the coolant pressure losses occurring in the cooling system of the turbine housing or of the exhaust-gas turbocharger are low. According to the present invention, an exhaust-gas turbocharger is provided with which it is ensured that the coolant pressure losses occurring in the cooling system of the turbine housing or of the exhaust-gas turbocharger are low. In the case of the invention, this is achieved in that the pressure loss between the coolant inlet and the coolant outlet of the turbine housing is minimized by means of special guidance of the flow of the coolant in the vicinity of the external coolant ports of the turbine housing. This has a positive effect on the entire cooling circuit of the internal combustion engine.

Figure 3:
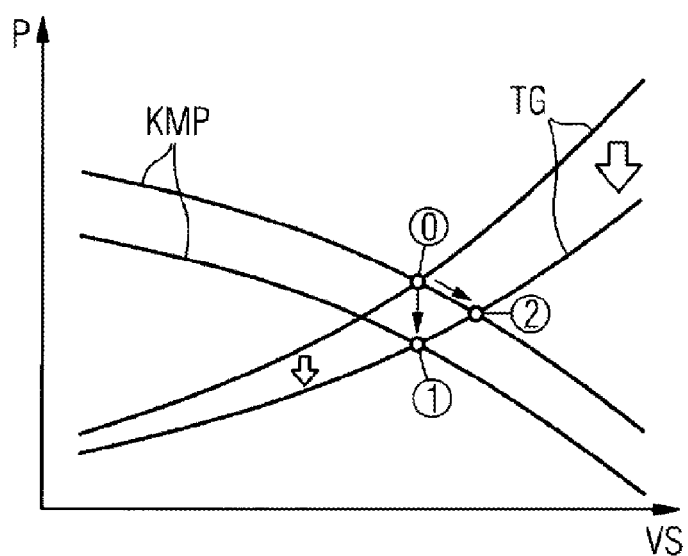
FIG. 3 shows a diagram illustrating the reduction of the pressure losses in the case of cooling of the turbine housing, and the resulting positive effects on the cooling circuit of the internal combustion engine.

FIG. 3 illustrates this effect. Here, in the diagram shown in FIG. 3, the volume flow rate VS of the coolant is plotted along the abscissa and the pressure P is plotted along the ordinate. If the power consumption of the coolant pump remains constant and the pressure loss of the turbine housing cooling decreases, then the coolant mass flow rate simultaneously increases. The point of intersection of the characteristic curves for the coolant pump KMP and of the cooled turbine housing TG shifts from 0) to 2). By contrast, if the coolant mass flow rate of the engine is kept constant in the case of reduced cooling losses in the turbine housing, then the power consumption of the coolant pump simultaneously falls. The point of intersection of the characteristic curves for the coolant pump and for the cooled turbine housing shifts from 0) to 1). Overall, a transition from an exhaust-gas turbocharger without turbine housing cooling to an exhaust-gas turbocharger with optimized turbine housing cooling requires only minor modifications to the cooling system of the engine. In the ideal case, it is even possible to continue to use an already existing coolant pump of the internal combustion engine, such that the incorporation of the cooling circuit of the exhaust-gas turbocharger into the cooling circuit of the internal combustion engine incurs, at most, small additional costs.

In an exhaust-gas turbocharger according to the present invention, the turbine housing has a coolant splitting-up region in the vicinity of its coolant inlet and has a coolant merging region in the vicinity of its coolant outlet. Splitting of the coolant to the cooling jacket of the turbine housing takes place in the coolant splitting-up region. In a further embodiment, splitting of the coolant takes place here in the sense that one of the coolant branch ducts of the cooling jacket of the turbine housing is supplied with coolant, and the other coolant branch duct delivers coolant via a coolant branch outlet of the turbine housing to the compressor housing, as is shown in principle in FIG. 2.

Both in the coolant splitting-up region and also in the coolant merging region, there is provided in each case one cone-shaped guide body which optimizes the flow guidance, as will be explained below on the basis of FIGS. 5 to 8.

Figure 4:
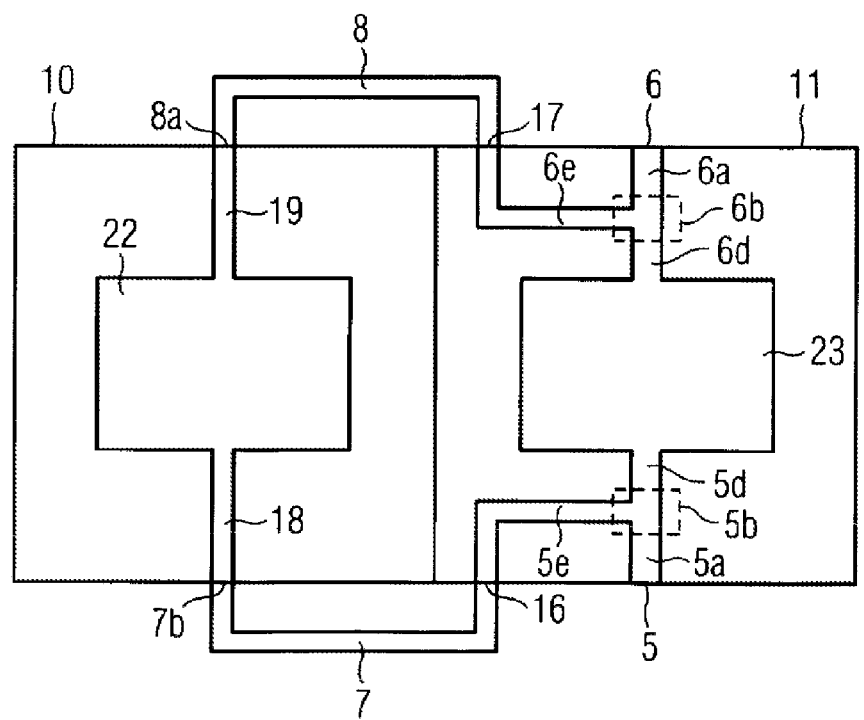
FIG. 4 shows a sketch of an exhaust-gas turbocharger, in the turbine housing of which the coolant is split between two coolant branch ducts, one of which leads to the cooling jacket of the turbine housing and the other of which leads to a coolant branch outlet of the turbine housing.

FIG. 4 shows a sketch of an exhaust-gas turbocharger, in the turbine housing of which splitting of the coolant takes place to two coolant branch ducts, one of which leads to the cooling jacket of the turbine housing and the other of which leads to a coolant branch outlet of the turbine housing.

The illustrated exhaust-gas turbocharger has a turbine housing 11 and a bearing housing 10 connected to the turbine housing. The turbine housing 11 has a coolant inlet 5 through which cooling water is supplied to the turbine housing during the operation of the exhaust-gas turbocharger. Said cooling water is provided for example from the cooling system of the internal combustion engine.

Furthermore, the turbine housing 11 has a coolant outlet 6, through which cooling water is discharged during operation of the exhaust-gas turbocharger. Said cooling water which is discharged from the turbine housing is returned to the cooling system of the internal combustion engine.

Furthermore, in the interior of the turbine housing 11, there is provided a cooling jacket 23, within which, during operation of the exhaust-gas turbocharger, coolant is transported in order to provide adequate cooling of constituent parts of the turbine housing, in particular of the wastegate flap seat and of the turbine spiral.

The coolant inlet 5 is connected to a coolant inlet duct 5a. The coolant outlet 6 is connected to a coolant outlet duct 6a.

In a coolant splitting-up region 5b, a first coolant branch duct 5d and a second coolant branch duct 5e branch off from the coolant inlet duct 5a provided between the coolant inlet 5 and the cooling jacket 23. The coolant branch duct 5d is connected to the cooling jacket 23 of the turbine housing, and the coolant branch duct 5e extends to a coolant branch outlet 16 of the turbine housing. A connecting hose 7 is provided between the coolant branch outlet 16 of the turbine housing and a coolant inlet 7b of the bearing housing 10.

From the coolant inlet 7b of the bearing housing 10, the coolant is conducted via a coolant inlet duct 18 of the bearing housing to a cooling jacket 22 of the bearing housing. The coolant exiting the cooling jacket 22 is conducted via a coolant outlet duct 19 of the bearing housing to the coolant outlet 8a of the bearing housing. From there, the coolant is returned via a connecting hose 8 to a coolant return inlet 17 of the turbine housing. The coolant return inlet 17 of the turbine housing is connected via a coolant return duct 6e of the turbine housing to the coolant merging region 6b of the turbine housing. The cooling jacket 23 of the turbine housing is connected via a coolant return duct 6d likewise to the coolant merging region 6b of the turbine housing. In the coolant merging region 6b, the coolant returned via the coolant return ducts 6d and 6e is merged and then supplied via the coolant outlet duct 6a of the turbine housing to the coolant outlet 6 of the turbine housing, and said coolant is returned from there into the cooling circuit of the internal combustion engine.

Both in the coolant splitting-up region 5b and also in the coolant merging region 6b there is provided in each case one cone-shaped guide body 15, as will be explained below on the basis of FIGS. 5 to 8.

Figure 5:
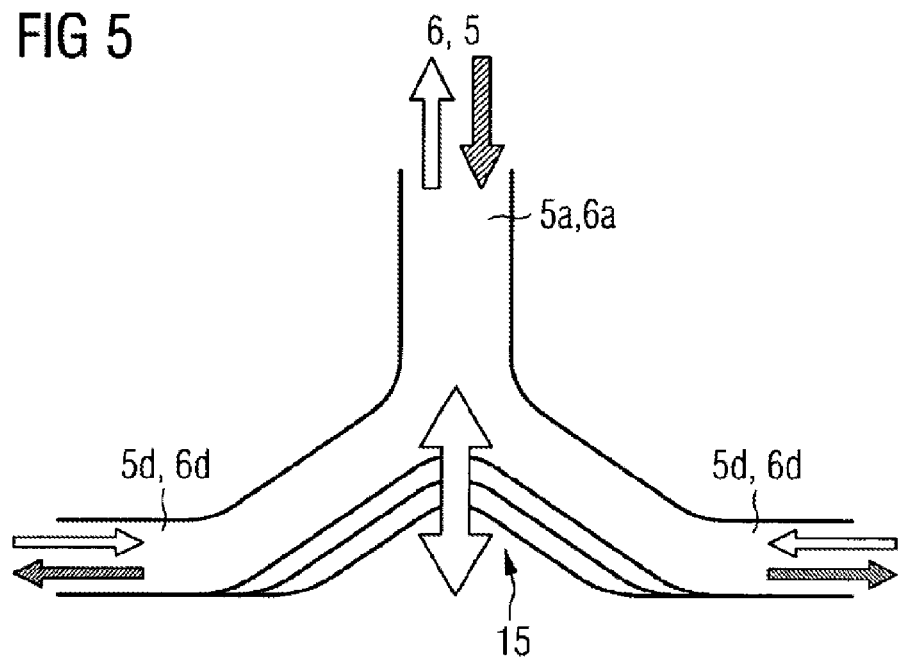
FIG. 5 shows a sketch illustrating a cone-shaped guide body.

FIG. 5 shows a sketch illustrating one such cone-shaped guide body 15, as is provided, according to the present invention, in the coolant splitting-up region 5b of the turbine housing and also in the coolant merging region 6b of the turbine housing.

The required cooling mass flow for an exhaust-gas turbocharger with a cooled turbine housing is relatively high. Tests carried out with regard to the coolant flow in the cooled turbine housing of an exhaust-gas turbocharger with external coolant port have shown that two regions have a particularly great influence with regard to the occurring pressure losses. These are the region around the coolant inlet and also the region around the coolant outlet. The reason for this is that said regions constitute constrictions with increased flow speed, through which the entire coolant mass flow for the turbine housing must be conducted. Downstream of the inlet and upstream of the outlet, the coolant flow is split up to a greater degree and is at a lower flow speed. Since the pressure loss increases with the square of the flow speed, the cooling jacket generates a significantly lower pressure loss in relation to the coolant inlet and the coolant outlet. Consequently, the flow guidance in the coolant inlet and also in the coolant outlet has been optimized. To attain an overall improvement in the flow guidance in said regions, use is made, according to the invention, of cone-shaped guide bodies. Said guide bodies render the flow geometry more robust with respect to manufacturing tolerances, and reduce the pressure losses. The opening angle of the guide bodies should basically be kept as small as possible in order to prevent flow detachment. Said opening angle is however substantially fixedly defined by the geometric conditions of the installation space. The height of the guide bodies may be freely selected within the limits imposed by the thickness of the cooling jacket. A variation of the height of the cone-shaped guide body, as shown in FIG. 5, leads to an optimum value for the cone height with minimal pressure losses for the turbine housing as a whole.

Figure 6:
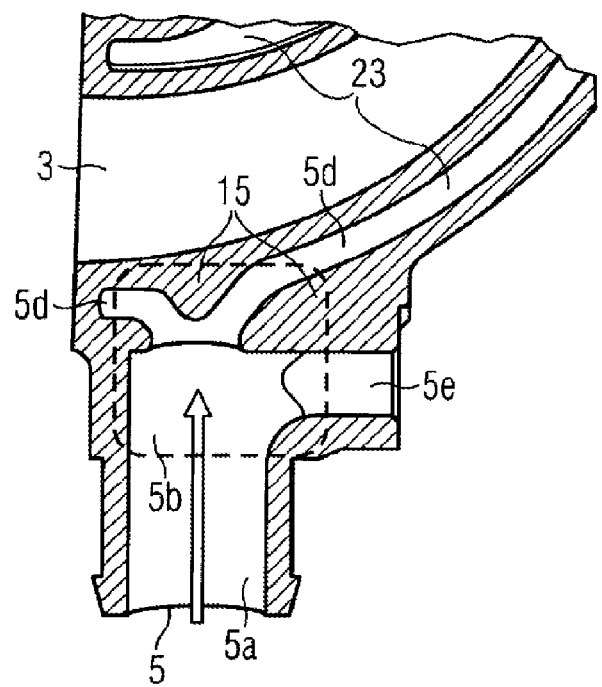
FIG. 6 shows a sectional illustration of a part of a turbine housing which has a coolant splitting-up region.

FIG. 6 shows a sectional illustration of a part of a turbine housing according to a further exemplary embodiment, in which the turbine housing has a coolant splitting-up region. In said exemplary embodiment, the coolant supplied to the turbine housing via the coolant inlet 5 thereof is supplied through the coolant inlet duct 5a of the turbine housing to a coolant splitting-up region 5b, and is split from there to the cooling jacket 23 of the turbine housing. A cone-shaped guide body 15 is provided in the coolant splitting-up region 5b. Furthermore, in said exemplary embodiment, a coolant branch duct 5e is provided via which, for example, coolant for the bearing housing of the exhaust-gas turbocharger is branched off. The reference numeral 3 denotes the exhaust-gas inlet of the turbine housing. The cone-shaped guide body 15 shown in FIG. 6 ensures that the coolant enters the cooling jacket of the turbine housing in a defined manner, and thus minimizes the pressure loss.

Figure 7:
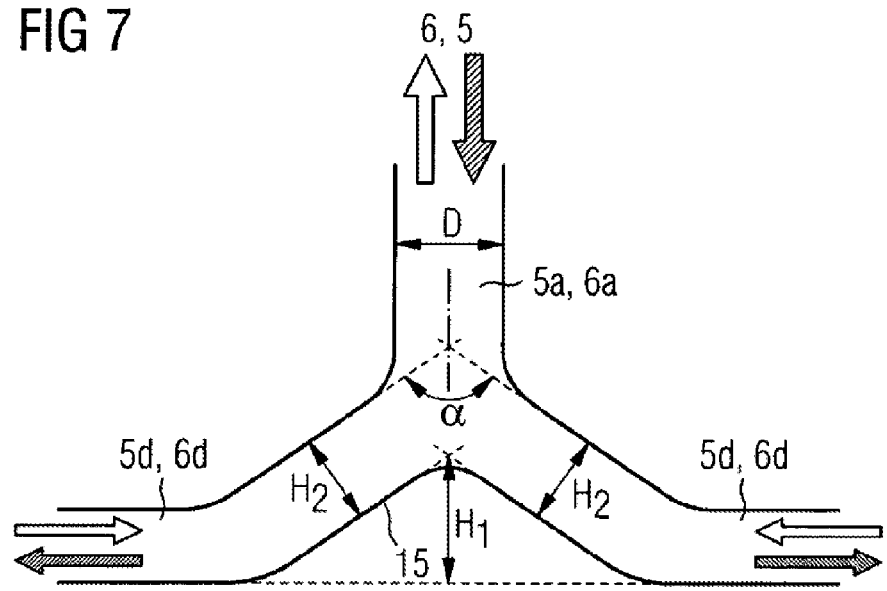
FIG. 7 shows a sketch for explaining the dimensioning of the cone-shaped guide body.

FIG. 7 shows a sketch for explaining the dimensioning of the cone-shaped guide body 15. Here, the letter D denotes the inlet cross section of the coolant inlet duct 5a or the outlet cross section of the coolant outlet duct 6a, the character a denotes the opening angle of the coolant inlet duct, the designation $H_1$ denotes the height of the cone-shaped guide body 15, and the designation $H_2$ denotes the flow cross section at the cone flanks.

Figure 8:
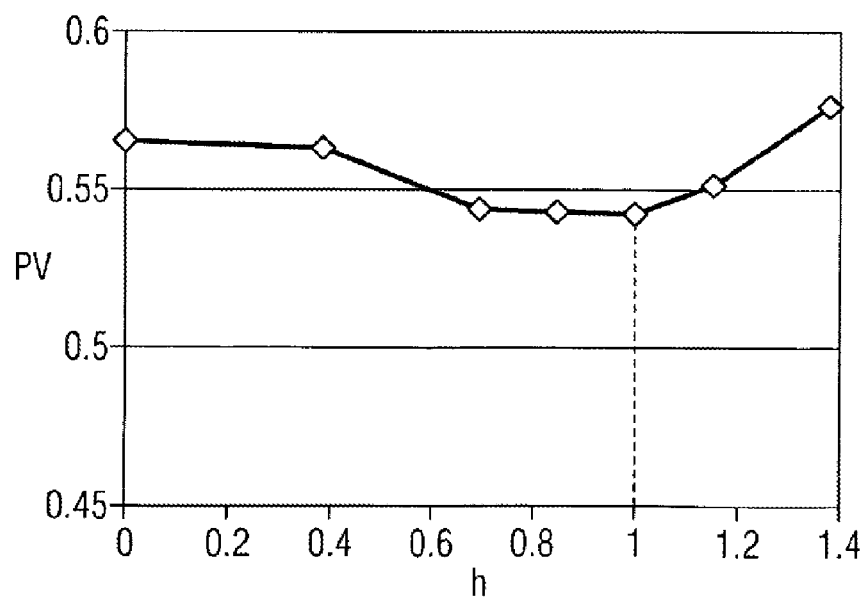
FIG. 8 shows a diagram illustrating the relationship between the pressure loss occurring in the turbine housing and the height of the cone-shaped guide body.

FIG. 8 shows a diagram illustrating the relationship between the pressure loss occurring in the turbine housing and the height of the guide body 15. Here, the dimensionless cone height h is plotted along the abscissa, and the likewise dimensionless total pressure loss PV is plotted along the ordinate. Said total pressure loss is in relation to the kinetic pressure in the flow cross section D directly over the guide body. It is evident that, in the case of a variation of the height h of the cone-shaped guide body 15, different values are attained for the pressure loss, and that optimum ranges exist in which the pressure loss is minimized. The following have been determined as optimum ranges:

$$0.47 \leq H_2/D \leq 0.54$$

and $$0.28 \leq H_1/D \leq 0.41,$$

wherein:
$H_1$ is the height of the guide body 15;
D is the flow cross section of the coolant inlet duct 5a or of the coolant outlet duct 6a, and
$H_2$ is the flow cross section at the cone flanks.

The invention claimed is:

1. An exhaust-gas turbocharger, comprising:
    a turbine housing formed with at least one of a coolant inlet duct or a coolant outlet duct; and
    a coolant splitting-up region in said turbine housing, said coolant splitting-up region being configured to split up coolant of said turbine housing delivered through said coolant inlet duct;
    a coolant merging region in said turbine housing, said coolant merging region being configured to merge partial coolant flows to form a common coolant outlet flow; and
    a cone-shaped guide body disposed in a region selected from the group consisting of said coolant splitting-up region and said coolant merging region.

2. The exhaust-gas turbocharger according to claim 1, wherein a cooling jacket is formed inside said turbine housing, said cooling jacket receiving coolant via a coolant branch duct and discharging the coolant to a coolant return duct.

3. The exhaust-gas turbocharger according to claim 1, wherein at least one of a coolant branch duct is connected to communicate with a coolant branch outlet of said turbine housing, or a coolant return duct is connected to communicate with a coolant return inlet of said turbine housing.

4. The exhaust-gas turbocharger according to claim 1, wherein said cone-shaped guide body is formed with cone flanks and wherein a ratio of a flow cross section at said cone flanks to a flow cross section of said coolant inlet duct is defined by:

$$0.47 \leq H_2/D \leq 0.54,$$

where $H_2$ is the flow cross section at said cone flanks and D is the flow cross section of said coolant inlet duct.

5. The exhaust-gas turbocharger according to claim 1, wherein said cone-shaped guide body is formed with cone flanks and wherein a ratio of a flow cross section at said cone flanks to a flow cross section of said coolant outlet duct is defined by:

$$0.47 \leq H_2/D \leq 0.54,$$

where $H_2$ is the flow cross section at said cone flanks and D is the flow cross section of said coolant outlet duct.

6. The exhaust-gas turbocharger according to claim 1, wherein a ratio of a height of said guide body to a flow cross section of said coolant inlet duct is defined by:

$$0.28 \leq H_1/D \leq 0.41,$$

where $H_1$ is the height of said guide body and D is the flow cross section of said coolant inlet duct.

7. The exhaust-gas turbocharger according to claim 1, wherein a ratio of a height of said guide body to a flow cross section of said coolant outlet duct is defined by:

$$0.28 \leq H_1/D \leq 0.41,$$

where $H_1$ is the height of said guide body and D is the flow cross section of said coolant outlet duct.

8. An exhaust-gas turbocharger, comprising:
    a turbine housing formed with a coolant inlet duct and a coolant outlet duct; and
    a coolant splitting-up region in said turbine housing, said coolant splitting-up region having a cone-shaped guide body configured to split up coolant of said turbine housing delivered through said coolant inlet duct into partial coolant flows;
    a coolant merging region in said turbine housing, said coolant merging region having a cone-shaped guide body configured to merge the partial coolant flows to form a common coolant outlet flow.

* * * * *